Nov. 11, 1952  M. G. BITTEL  2,617,139
MEANS FOR MOUNTING A CASTOR ASSEMBLY ON A BOAT
Filed March 14, 1947  4 Sheets-Sheet 1
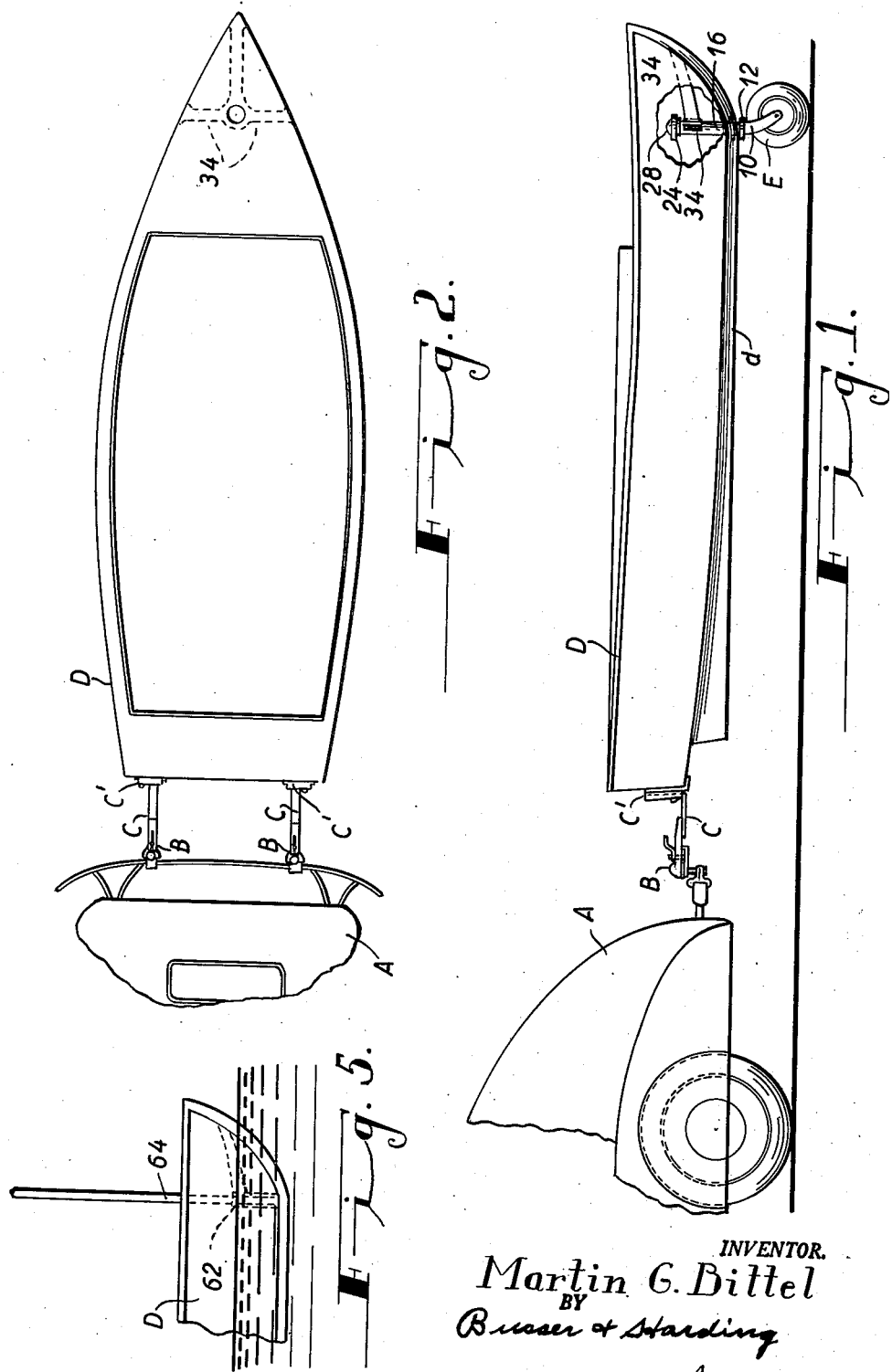
INVENTOR.
Martin G. Bittel
BY
Busser & Harding
ATTORNEYS

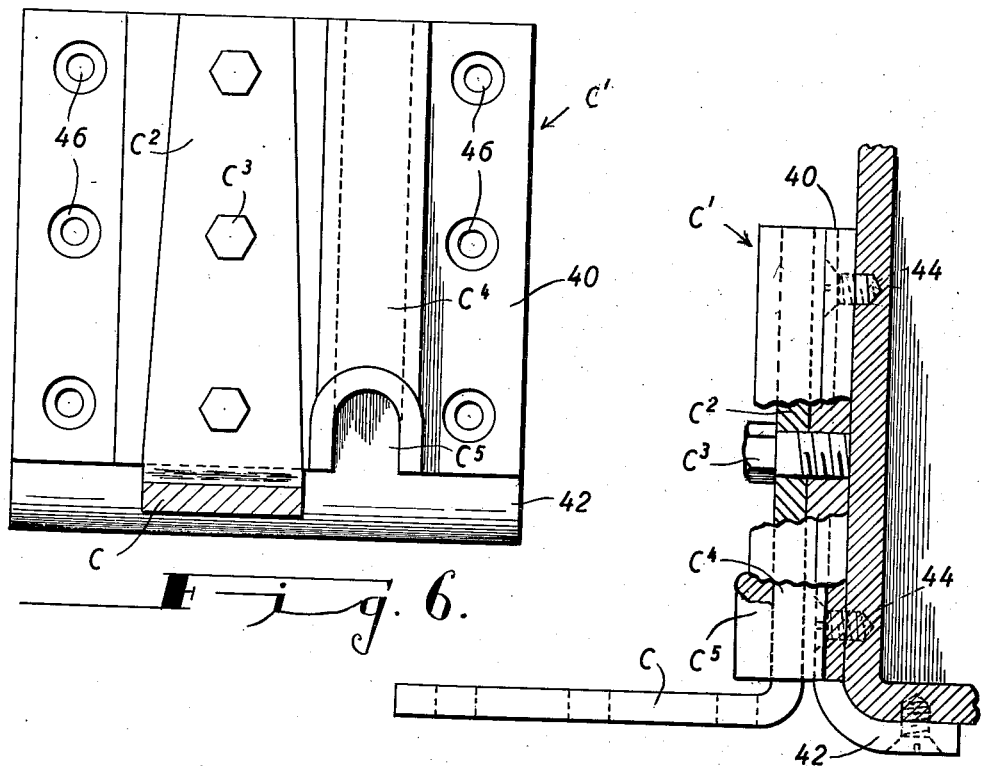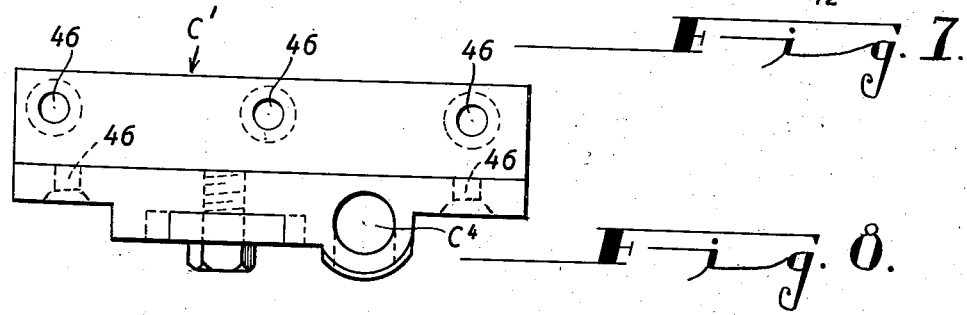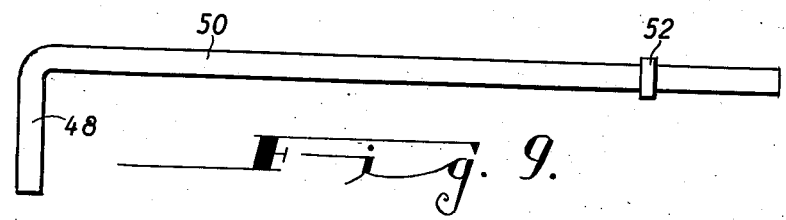

Nov. 11, 1952           M. G. BITTEL           2,617,139
MEANS FOR MOUNTING A CASTOR ASSEMBLY ON A BOAT
Filed March 14, 1947           4 Sheets-Sheet 3
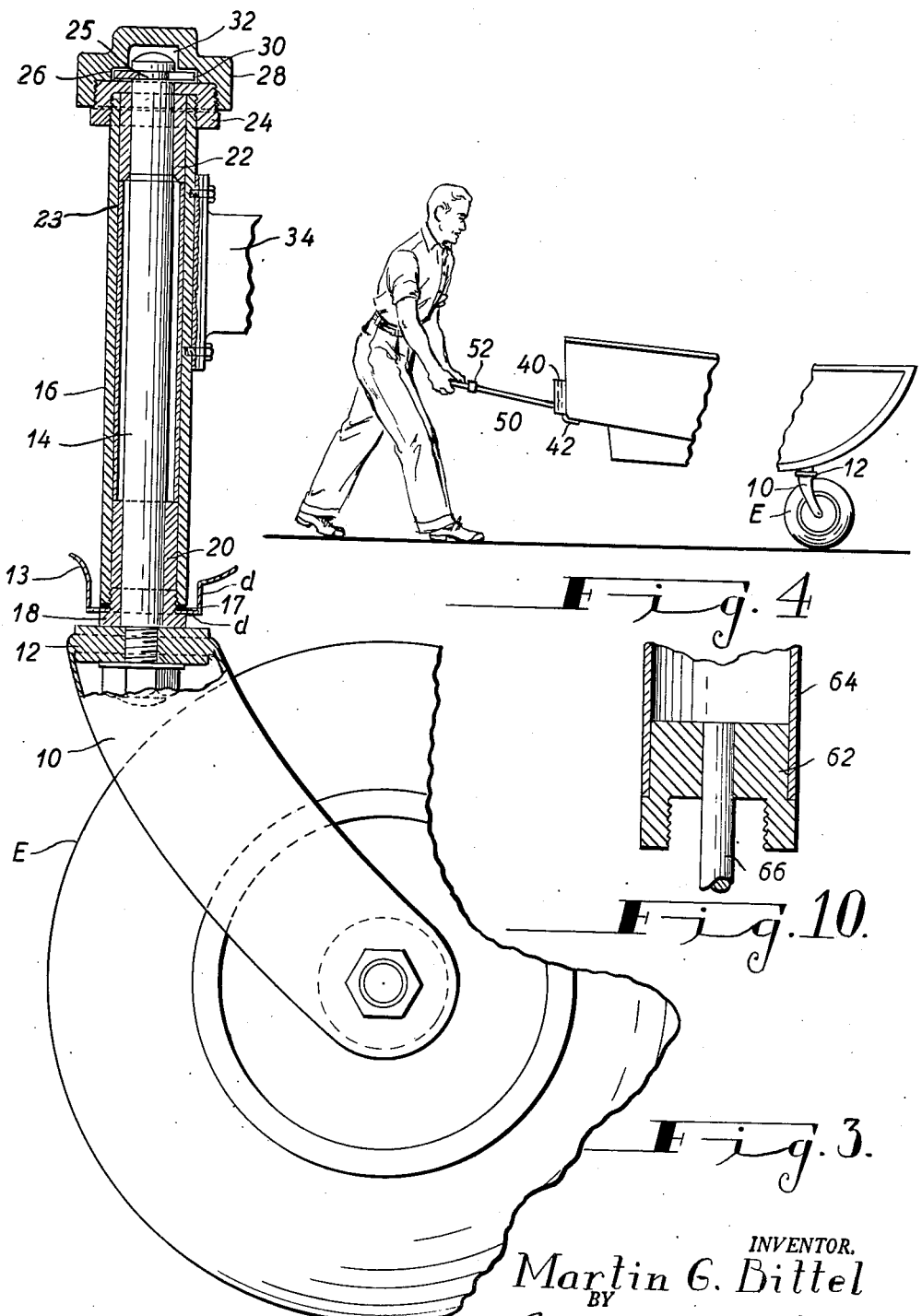
INVENTOR.
Martin G. Bittel
BY
Busser + Harding
ATTORNEYS.

Nov. 11, 1952      M. G. BITTEL      2,617,139
MEANS FOR MOUNTING A CASTOR ASSEMBLY ON A BOAT
Filed March 14, 1947      4 Sheets—Sheet 4
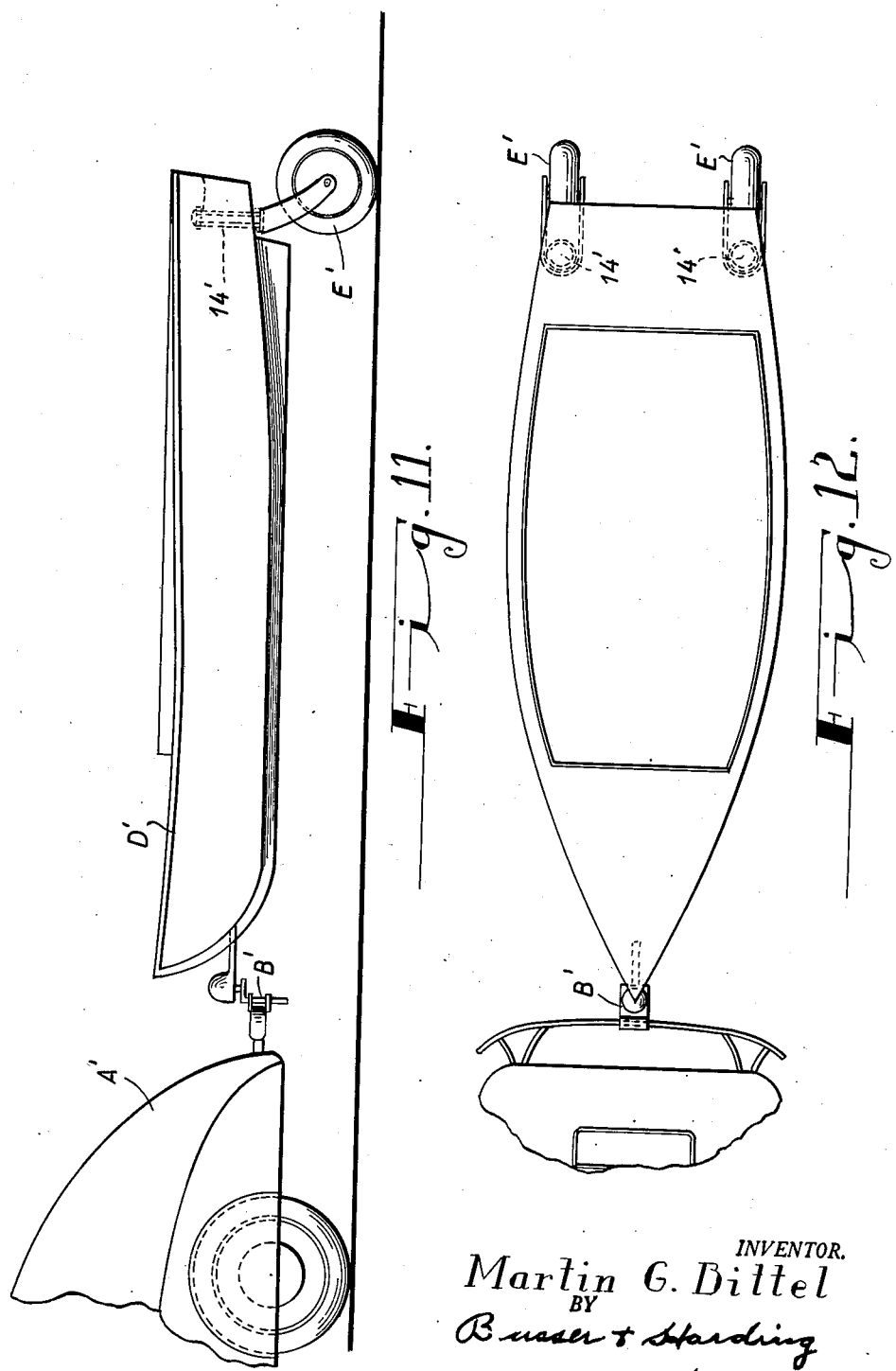
INVENTOR.
Martin G. Bittel
BY
Busser + Harding
ATTORNEYS Patented Nov. 11, 1952

2,617,139

UNITED STATES PATENT OFFICE 2,617,139

MEANS FOR MOUNTING A CASTOR ASSEMBLY ON A BOAT

Martin G. Bittel, North Hills, Pa., assignor to Sun Shipbuilding & Dry Dock Company, Chester, Pa., a corporation of Pennsylvania Application March 14, 1947, Serial No. 734,735

2 Claims. (Cl. 16—38)

This invention relates to means for towing, behind an automobile, small boats such as dingeys, catboats and small motor boats without requiring a separate trailer.

One of the objects of my invention is the provision of means whereby boats of this character may be equipped with means, so the boat may be trundled over a roadway as a trailer attached to an automobile.

Another object of my invention is the provision of means permanently connected to boats to which the supporting wheels may readily be attached to provide means for transporting the boats on the ground, and also detached before placing the boats overboard, as well as to so arrange the means permanently connected to the boats to provide sockets for masts or other type staffs which can readily be mounted therein.

Another object of my invention is the provision of means whereby the boat may be trundled in a manner similar to the wheeling of a barrow.

Having now described in a general way the nature and purpose of this invention, I will proceed for illustrative purposes, to a detailed description of a preferred embodiment thereof, with reference to the accompanying drawings, in which:

Fig. 1 is a side elevation of a boat connected to a trailer coupling of an automobile, with a portion of the skin of the boat broken away to show the supporting connections within the boat for a caster wheel;

Fig. 2 is a plan view of Fig. 1;

Fig. 3 is a vertical section through the support for the caster;

Fig. 4 is a detail view showing the boat being wheeled like a wheelbarrow after being uncoupled from the automobile when the boat is equipped in the manner shown in Figs. 1 and 2;

Fig. 5 is a view showing the caster support used as a socket for a mast or a staff;

Fig. 6 is a face view of one of the brackets connected to the stern of the boat to which a coupling from an automobile is connected;

Fig. 7 is a side view of the bracket shown in Fig. 6 with portions broken away;

Fig. 8 is a plan view of the bracket;

Fig. 9 is a side elevation of one of the handles which is connected to the brackets when trundling the boat like a barrow;

Fig. 10 is a sectional view of the cap for securing a mast to the caster support as shown in Fig. 5;

Fig. 11 is a side elevation of another manner of supporting a boat when used as a trailer;

Fig. 12 is a plan view of Fig. 11.

Referring to Figs. 1–10 of the drawings, the reference A designates the rear end of an automobile, B trailer coupling members extending rearwardly from the automobile, C coupling members extending from each connecting member C' mounted on the stern of a boat D which is coupled to a coupling member B, and E a caster wheel for supporting the bow of the boat, the arrangement being such that the boat may be towed over the roadway in the same manner as a trailer.

The caster wheel E is mounted between the members of a fork 10 extending from a head 12 at the lower end of a stem 14 mounted for rotation in bearings extending vertically from the keel of the boat.

The bearings and support for the stem 14 of the caster comprise a tubular member, or socket member 16, preferably of aluminum, having a thick wall provided with an internal thread at its lower end and an external thread at its upper end, both ends being machined to form a tight joint with a machined face of a threaded sleeve, the lower sleeve coacting with a gasket between the end of the tubular member 16 and a machined face of a threaded sleeve.

The boat D shown in Fig. 1 is formed of sheet metal and is provided with a hollow keel d within which the tubular member 16 is seated, the metal forming the bottom of the keel being bored to provide an opening just slightly larger than the bottom of the thread in the tubular member 16. An externally threaded sleeve 18, having a flange provided with wrench-engaging faces and a machined joint-forming face, is passed through the opening in the keel and threaded into the tubular member 16 with a suitable gasket 17 thereon, the sleeve being screwed home to form a tight joint between the various parts.

Seated on the face of the sleeve 18, within the tubular member 16, is a bearing sleeve 20 for the stem 14, and 22 is a similar sleeve in the upper end of the tubular member 16, the bearing sleeve 20 and 22 being held spaced from each other by a spacing sleeve 23, which is also preferably of aluminum.

Threaded on the upper end of the tubular member 16 is an internally threaded sleeve 24 provided with an inwardly extending flange seated on the upper faces of the bearing sleeve 22 and the upper end of the tubular member 16. The upper portion of the sleeve 24 is provided with an external thread and below said thread is provided with wrench-engaging faces, whereby the sleeve may be secured to or removed from the tubular member 16.

The upper end of the stem 14 extends through the sleeve 24 and is provided with an annular key groove 25 slightly above the upper face of the sleeve 24, and mounted in said slot is a key 26 of annular form, the bore therethrough being substantially equal to the diameter of the bottom of the key groove 25 in the stem. The key 26 is slotted in the usual manner so that it can be slipped into the groove to limit the axial movement of the stem 14, to prevent the dropping out of the caster while the key is positioned on the stem.

Mounted on the external threads on the sleeve 24 is a cap nut 28, having a face which is in engagement with the upper face of the sleeve 24, when screwed home, and is provided with two recesses 30 and 32, the recess 30 being slightly larger in diameter than the key 26 and slightly greater in depth than the thickness of the key, while the recess 32 is slightly larger in diameter than the end of the stem 14 and of a depth to provide proper clearance above the end of the stem.

The head 12 on the stem 14 may be provided with ball bearings between the head and the lower face of the sleeve 18 as usual in casters, and when the caster is assembled in the tubular member 16 as shown in Fig. 1, the end of the boat is supported on the head of the caster, while the upper face of the key 26 will just be clear of the bottom of recess 30 in the cap, thus leaving a slight space between the key and the upper face of the sleeve 24, so that the load is supported on the head of the caster and thus permits free rotation of the stem 14.

Extending from the upper end of the tubular member 16 to the sides and bow of the boat are a plurality of bracing members 34, the outer ends of which are secured to the boat in any desired manner, while the inner ends may be formed integral with the tubular member 16, or secured thereto by bolts, welding or other suitable means as shown in Fig. 3 to provide rigid bracing means for the upper end of the tubular member 16.

The above construction for mounting the bearings for a caster wheel and the means for bracing the upper end thereof is one form adapted to be supplied with a boat equipped with means for converting a boat into a trailer.

It is desired to equip a boat with means for converting the same into a trailer, all of the elements associated with the tubular member 16 shown in Fig. 3, with the exception of the braces, can be used without change, and three bracing members, of the proper length and ends can be provided for securing the bracing to the sides of the tubular member 16, together with coupling members having a base at the proper angle for securing to the bow of the boat.

In Figs. 5 and 10 I have illustrated the caster support 16 used as a socket for a mast or a staff which may be used as a support for an antenna when afloat. In the form shown in Fig. 10, the cap nut 28 is replaced by a cap 62 having a tubular staff 64 and a stem 66 welded thereto. The stem 66 is preferably of a length to extend through the sleeve 18, and of a diameter to closely fit the bearings 20 and 22, and thus provide a rigid support for the mast or staff.

When a boat is connected to an automobile by means of two trailer couplings C as shown in Figs. 1 and 2, I preferably provide right and left coupling members C', one such coupling being shown in Figs. 6, 7 and 8 provided with means in which a handle may be mounted so the boat may be trundled as shown in Fig. 4 as these coupling members C' are identical with the exception that one is the reverse of the other, differing only in the position of the handle receiving openings.

Each of the coupling members C' comprises a body member having a vertically extending portion 40 and a horizontal portion 42 extending from the lower end of the vertical portion.

The vertical portion 40 and the horizontal portion 42 are secured to the stern and bottom of the boat, respectively, by means of screws 44 shown in dotted lines in Fig. 7 which extend through holes 46 shown in Figs. 6 and 8.

The body portion 40 of the coupling member C' is provided with a tapered slot in which is secured a tapered vertically extended portion $C^2$ of a coupling member C by means of cap screws $C^3$, the horizontal portion extending from the lower end of the tapered portion is arranged to be connected to the trailer coupling B.

The coupling member C' is provided with a through vertical opening $C^4$ in an offset at the side of the tapered slot which communicates with a laterally extending slot $C^5$ at the lower end thereof. The opening $C^4$ being arranged to receive the short arm 48 of a handle shown in Figs. 4 and 9, and, when the handle is positioned in the coupling C', as shown in Fig. 4, the longer arm 50 of the handle will extend rearwardly from the coupling and is seated in the slot $C^5$ in the coupling to prevent the rotation of the short arm 48 of the handle in the opening $C^4$.

When it is desired to connect the means to convert a boat into a trailer which has been equipped with a bearing member for the caster as shown in Fig. 1 while the boat is overboard, the cap nut 28 shown in Fig. 3 or a mast as shown in Fig. 5, which has been used to close the upper end of the tubular member 16 to prevent any flow of water therethrough when the boat was propelled through the water, is first removed and the stem 14 of the caster is inserted therein, the key 26 is slipped into the groove 25 in the upper end of the stem 14, and the cap nut 28 is replaced to retain the key in position to prevent the sleeve 16 moving along the stem if the boat should be bounced while being trundled over a roadway.

After the caster has been connected to the boat, the short ends 48 of the handles are inserted into the openings $C^4$ in the couplings C' and the boat D is trundled to the point where the boat is to be connected to the automobile for towing. The handles are then removed from the couplings C' and the coupling members C are connected to the trailer couplings B, as shown in Figs. 1 and 2, and the boat is trundled to the desired place by the automobile.

By inserting the long end of the handle into the opening $C^4$ I have provided two legs to allow the boat to stand in a stable position when not in use.

In Figs. 11 and 12 I have shown the bow of a boat D' coupled to an automoible A' by a single trailer coupling B'. Mounted in the bottom of the boat D' at the stern thereof are two tubes 16' in which the stems 14' of the casters E' are mounted. In this form the trailer boat is adapted to swing about the coupling B' connected to the rear of the automobile.

The mountings for the caster wheels in this form are substantially the same as the mounting for the caster shown on Figs. 1 and 2.

One of the advantages of my invention results from the provision of means whereby small boats may be equipped with means for converting the boat into a trailer, which can be towed behind an automobile, thus providing means enabling the owner of a small boat capable of being towed over a roadway to keep his boat at any suitable place remote from the water, and readily transport the boat to the desired shore for an outing by means of his automobile, and at the end of his outing to tow the boat back with him, thus permitting him to use his boat at any selected shore for an outing and not confining the use of his boat to a single shore.

Another advantage results from the provision of means fixedly connected to the boat which is entirely within the hull of the boat so that none of the means for converting the boat will form a drag on the boat while moving through the water.

Another advantage of my invention results from the provision of means whereby the boat can be provided with a fixed caster socket within one end of the hull of the boat, so that the boat can be converted into a trailer by simply inserting the stem of a caster into the socket and applying means to the upper end of the stem to prevent axial movement of the stem in the socket, and connecting a readily removable coupling member to the other end of the boat, and when reconverting for use as a boat disconnecting the coupling member, removing the means for holding the stem of the caster in the socket, and removing the caster stem with the wheel attached thereto, which can be placed in the automobile when the boat is afloat.

Another advantage results from the provision of a socket for the stem of a caster, which can be used when afloat as a socket for a mast or a staff.

What I claim and desire to protect by Letters Patent is:

1. Means for mounting a castor assembly adapted for use in converting a small boat into a trailer to be towed over the ground, the castor assembly including a wheel, a fork and an axle in the fork mounting the wheel, the castor mounting means comprising a socket member adapted to be mounted in the boat and open at both ends, said socket member having a flanged sleeve in the lower end thereof and a second sleeve secured to the upper end thereof, said second sleeve reducing in size the upper opening of the socket member, a stem rotatably mounted in said socket member and extending above the upper end of said socket member and said second sleeve, said stem having a keyway in the upper end thereof, a key in said keyway to retain said stem in said socket member, and a cap member mounted on said second sleeve, said fork being fixedly secured to the lower end of said stem and abutting against the lower end of said flanged sleeve.

2. Means for mounting a castor wheel assembly adapted for use in converting a small boat into a trailer to be towed over the ground, the castor assembly including a wheel, a fork and an axle in the fork mounting the wheel, the castor mounting means comprising a socket member adapted to be mounted in the boat and open at both ends, said socket member having a flanged sleeve in the lower end thereof and a second sleeve secured to the upper end thereof, a pair of bearing sleeves in said socket member adjacent said first and second sleeve members respectively, a stem rotatably mounted in said socket member and extending above the upper end of said socket member and said second sleeve, said stem having a keyway in the upper end thereof, a key in said keyway to retain said stem in said socket member, and a cap member mounted on said second sleeve, said fork being secured to the lower end of said stem and abutting against the lower end of said flanged sleeve.

MARTIN G. BITTEL.

REFERENCES CITED

The following references are of record in the file of this patent:

UNITED STATES PATENTS

| Number | Name | Date |
|---|---|---|
| 1,483,598 | Runne | Feb. 12, 1924 |
| 1,755,537 | Deisler | Apr. 22, 1930 |
| 1,804,639 | Noelting et al. | May 21, 1931 |
| 1,944,185 | Langer | Jan. 23, 1934 |
| 1,946,497 | Little | Feb. 13, 1934 |
| 2,065,715 | Leon | Dec. 29, 1936 |
| 2,157,186 | Pinter et al. | May 9, 1939 |
| 2,256,038 | Woodruff | Sept. 16, 1941 |